United States Patent
Bridges et al.

(10) Patent No.: US 7,441,665 B2
(45) Date of Patent: Oct. 28, 2008

(54) WATER PURIFICATION CARTRIDGE

(75) Inventors: Michael A. Bridges, Seattle, WA (US); John P. Souza, Astoria, OR (US)

(73) Assignee: HaloSource, Inc., Bothell, WA (US)

( * ) Notice: Subject to any disclaimer, the term of this patent is extended or adjusted under 35 U.S.C. 154(b) by 260 days.

(21) Appl. No.: 10/676,730

(22) Filed: Oct. 1, 2003

(65) Prior Publication Data

US 2005/0072729 A1    Apr. 7, 2005

(51) Int. Cl.
*B01D 35/00*    (2006.01)
*B01D 24/00*    (2006.01)
*B01D 29/00*    (2006.01)

(52) U.S. Cl. .................. 210/474; 210/232; 210/256; 210/282; 210/455; 210/456; 210/503; 210/753; 210/754

(58) Field of Classification Search ............. 210/232, 210/256, 257.1, 265, 282, 455, 456, 458, 210/474, 476, 342, 753, 754
See application file for complete search history.

(56) References Cited

U.S. PATENT DOCUMENTS

| | | | |
|---|---|---|---|
| 2,584,551 A | 2/1952 | Chambers et al. | |
| 3,909,414 A | 9/1975 | Drath | |
| 4,594,392 A * | 6/1986 | Hatch .................. | 525/327.1 |
| 4,609,463 A | 9/1986 | Macevicz et al. | |
| 4,640,774 A | 2/1987 | Garcera et al. | |
| 4,714,546 A | 12/1987 | Solomon et al. | |
| 5,057,612 A | 10/1991 | Worley et al. | |
| 5,061,367 A | 10/1991 | Hatch et al. | |
| 5,211,973 A | 5/1993 | Nohren, Jr. | |
| 5,308,482 A | 5/1994 | Mead | |
| 5,407,573 A | 4/1995 | Hughes | |
| 5,472,606 A | 12/1995 | Steere et al. | |
| 5,490,983 A | 2/1996 | Worley et al. | |
| 5,498,333 A | 3/1996 | Canther | |
| 5,518,613 A | 5/1996 | Koczur et al. | |
| 5,562,824 A | 10/1996 | Magnusson | |
| 5,882,357 A | 3/1999 | Sun et al. | |
| 5,897,770 A | 4/1999 | Hatch et al. | |
| 5,902,818 A | 5/1999 | Worley et al. | |
| 6,156,202 A | 12/2000 | Singh et al. | |
| 6,187,192 B1 | 2/2001 | Johnston et al. | |
| 6,274,038 B1 * | 8/2001 | Reid .................. | 210/206 |
| 6,294,185 B1 | 9/2001 | Worley et al. | |

(Continued)

FOREIGN PATENT DOCUMENTS

WO    WO 2004/000732 A1    12/2003

*Primary Examiner*—John Kim
(74) *Attorney, Agent, or Firm*—Christensen O'Connor Johnson Kindness PLLC

(57) ABSTRACT

The water purification cartridge treats water with a halogen liberated from halogenated hydantoinyl resins and polymers, resulting in the safe, complete, and economical purification of non-potable water at low flow rates typically found in gravity feed filtration systems and at water pressures of less than 1 psig. The cartridge of the invention purifies non-potable water of bacteria, viruses, and some protozons without the need for additional power sources or risk to the consumer for exposure to chemicals that have been identified to have harmful, long-term effects. The cartridge described herein enables a gravity fed water purification system by combining the cartridge with conventional filters, such as porous diatomaceous earthen ceramic water filters or activated carbon filters packed either with granular activated carbon or block.

21 Claims, 3 Drawing Sheets

U.S. PATENT DOCUMENTS

| | | |
|---|---|---|
| 6,419,821 B1 | 7/2002 | Gadgil et al. |
| 6,469,177 B1 | 10/2002 | Worley et al. |
| 6,524,477 B1 | 2/2003 | Hughes |
| 6,548,054 B2 | 4/2003 | Worley et al. |
| 6,555,000 B2 | 4/2003 | Knight |
| 6,602,425 B2 | 8/2003 | Gadgil et al. |
| 2004/0149642 A1* | 8/2004 | Vandenbelt et al. ......... 210/282 |

* cited by examiner

WATER PURIFICATION CARTRIDGE

FIELD OF THE INVENTION

The present invention is related to water purification and water disinfection in low flow applications, such as gravity feed filtration devices that do not require electricity or power sources to operate.

BACKGROUND OF THE INVENTION

Reliable potable drinking water sources are scarce in developing countries. High mortality rates can be attributed to inadequate water purification. Cholera, typhoid, dysentery, and rotavirus diarrhea are constant problems faced by people in countries who are forced to use contaminated water.

The lack of safe water supplies perpetuates and aggravates the cycle of poverty and disease. Some efforts have been made to provide clean, potable water in places where power is unavailable. Gravity feed filter systems are normally used to purify non-potable water at the point of use. Gravity feed filter systems are reliable and inexpensive.

The use of halogens such as chlorine, bromine, and iodine for water purification is well documented and widely used in developing countries. The most common forms for treating water with halogens is to add liquid bleach or a chlorine tablet to a pot of non-potable water and to wait for a prescribed period of time before decanting the water. One of the difficulties of using halogens is in maintaining a proper level of residual halogen for proper microbial control. Additionally, iodine, a commonly used halogen in gravity filters, has lost favor with consumers and health officials because iodine causes permanent and debilitating health problems in children and pregnant women.

Recently, polymers having heterocyclic N-halamines have been developed that can provide reliable levels of residual chlorine and bromine. One such agent that holds promise is a halogenated polystyrene hydantoin bead, described in U.S. Pat. No. 6,548,054, to Worley et al., incorporated herein by reference in its entirety.

SUMMARY OF THE INVENTION

The present invention is related to a water purification cartridge suitable to be used in gravity fed water purification systems.

One embodiment of the present invention is related to a gravity fed water purification cartridge. Because the water purification cartridge relies on gravity, the cartridge's inlet for untreated water is relatively higher than the cartridge's outlet for treated water, i.e., water at the inlet has more potential energy than water at the outlet of the cartridge. It is to be understood when reading the disclosure that any directional language used is intended to be read in the context of the figures. The water purification cartridge includes an inlet head cap coupled with a prefilter. The inlet head cap has an inlet for untreated water. The water purification cartridge also includes a ring member which is in fluid flow communication with the inlet head cap. The ring member is configured to evenly distribute the untreated water to a purification medium. The water purification cartridge includes a purifier vessel containing the purification medium. The purifier vessel is in fluid flow communication to receive the untreated water from the ring member. The water purification cartridge includes a bulkhead coupled to the inlet head cap. The bulkhead is configured to divide the untreated water from the treated water. The water purification cartridge includes a dwell chamber coupled to the bulkhead. The dwell chamber is provided downstream from the purifier vessel and is exterior to the purifier vessel. The dwell chamber provides residence time for treatment of the water with residual halogen supplied by the purification medium. The water purification cartridge includes an outer skin coupled to the bulkhead. The outer skin is exterior to the dwell chamber. The outer skin and the dwell chamber are configured to provide an annular space there between where the treated water can be post treated with additional conditioning medium. The outer skin is configured to discharge the treated water below the inlet of the untreated water.

In another embodiment, the water purification cartridge includes an inlet member, wherein the inlet member provides untreated water in an axial direction. The water purification cartridge may be generally symmetrical about a longitudinal center axis as the cartridge is rotated about the axis. Axial direction means that the general flow or the majority of the flow is in a direction parallel to the axis of rotational symmetry. The water purification cartridge includes a ring member adjacent to the inlet member. The ring member is configured to distribute the untreated water in a radial direction. Radial direction means that the general flow or the majority of the flow is in a direction parallel to a radius from the center axis of symmetry. The water purification cartridge includes a purifier vessel adjacent to the ring member. The purifier vessel is configured to treat untreated water to provide treated water. The water purification cartridge includes a bulkhead adjacent to the purifier vessel. The bulkhead is configured to separate untreated water from treated water in the cartridge. The water purification cartridge includes a dwell chamber exterior to the purifier vessel. The dwell chamber is configured to provide treated water flow in an upward axial direction.

In another embodiment, the water purification cartridge includes a purifier vessel to treat untreated water with a purification medium that is selected from at least one from a halogenated polystyrene hydantoin, a halogenated polymeric sulfonamide resin, a halogenated hydantoinyl siloxane, and a halogenated polystyrene triazinedione. The water purification cartridge also includes a dwell chamber after the purifier vessel to provide residence time so that the treated water can contact residual halogen liberated from the purification medium. The halogen can be chlorine or bromine.

Another embodiment of the present invention is related to a gravity fed water purification system. The water purification system includes a prefilter interior to an untreated water container. The water purification system includes a water purification cartridge in fluid flow communication with the prefilter. The water purification cartridge is interior to a treated water container. The untreated water container and the treated water container are integrally coupled to prevent the entry of untreated water into the treated water container. The cartridge includes a purification medium capable of bonding and releasing a halogen. In use, the water purification system is fed untreated water in the untreated water container. The untreated water flows into the prefilter and through the cartridge. The cartridge treats the untreated water and discharges treated water into the treated water container.

The water purification cartridge according to the present invention treats water resulting in the safe, complete, and economical purification of non-potable water at low flow rates typically found in gravity feed filtration systems and at water pressures of less than 1 psig. The cartridge of the invention purifies non-potable water of bacteria, viruses, and some protozons without the need for additional power sources or risk to the consumer for exposure to chemicals that have been identified to have harmful, long-term effects. The cartridge described herein enables a gravity fed water purification system by combining the cartridge of the invention with conventional filters, such as porous diatomaceous earthen ceramic water filters or activated carbon filters packed either with granular activated carbon or block. Such earthen ceramic filters and activated carbon filters cannot inactivate, remove, or otherwise treat and control many pathogenic microorganisms and viruses such as *Klebsiella terrigenia* and poliovirus to levels suitable to meet the United States Environmental Protection Agency (EPA) and/or World Health Organization (WHO) guidelines.

The cartridge of the invention can be provided with a purification medium of polystyrene hydantoin and halogenated polystyrene hydantoin resins, heterocyclic N-halamine polymers, and hydantoinyl siloxanes as described in U.S. Pat. No. 6,548,054, filed Sep. 6, 2001; 5,490,983, filed Jul. 28, 1994; and U.S. application Ser. No. 10/400,165, filed Mar. 24, 2003, to Worley et al., all expressly incorporated herein by reference in their entirety. Such resins and polymers can bind and release a halogen, such as chlorine or bromine. A suitable form of the polystyrene hydantoin and halogenated polystyrene hydantoin used in the present invention is a spherical bead of about 50 microns to about 700 microns in diameter. This polymer form lends itself to application in a packed bed configuration. The cartridge according to the invention can be used with other halogen binding media used for water purification, such as halogenated derivatives of poly(styrene-vinyl dibenzene)sulfonamide resins, polystyrene triazinediones, hydantoinyl siloxanes, and derivatives of polystyrene hydantoin. In general, polymeric compounds including N-halamine moieties, can be used in the filter cartridge according to the present invention.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
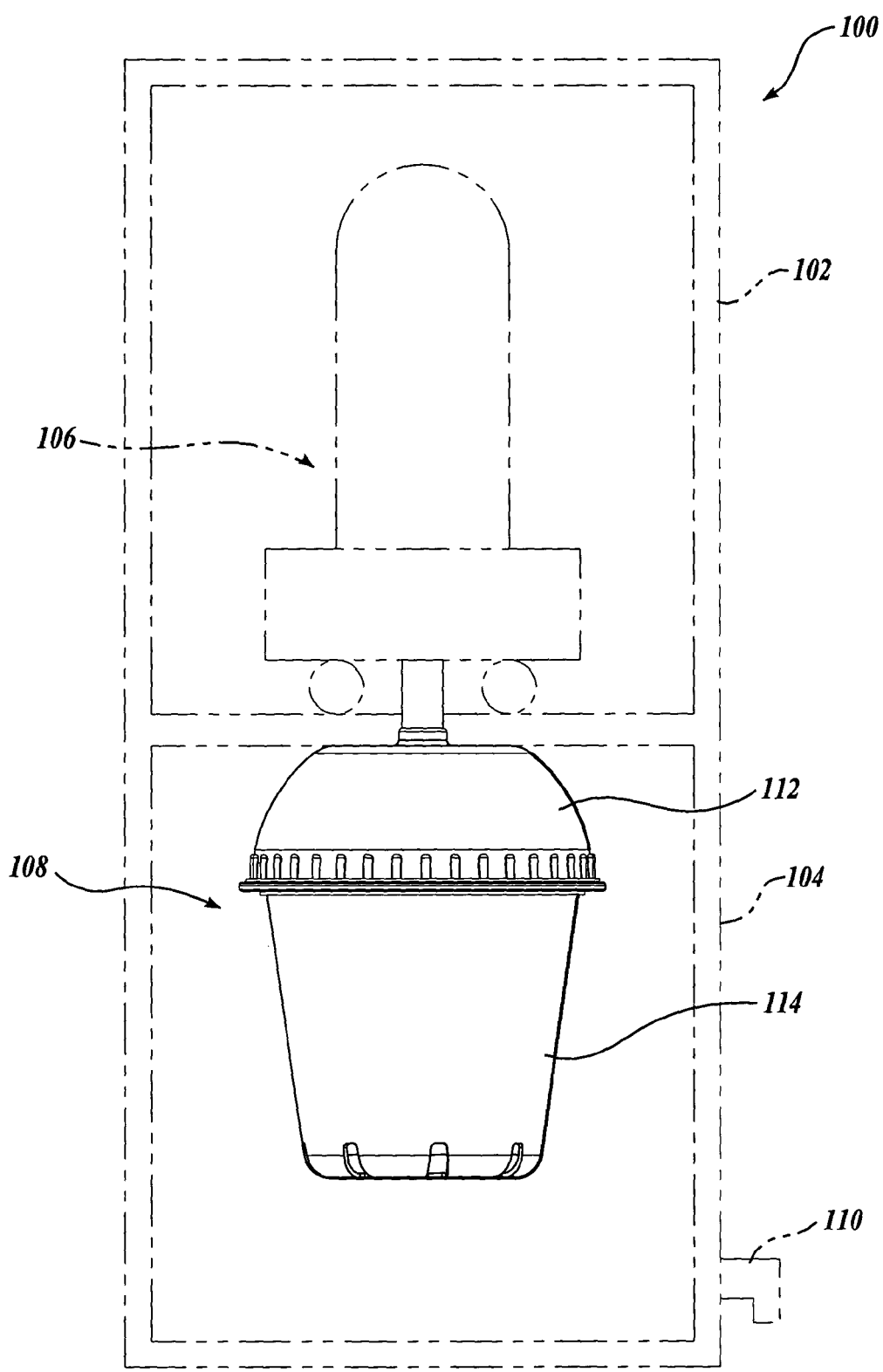
FIG. 1 is a schematic illustration showing the location of a cartridge relative to a prefilter in a gravity fed water purification application according to the present invention.

Referring to FIG. 1, a gravity fed water purification system 100 comprises a feed water container 102 (untreated water container), and a purified water container 104 (treated water container). The entire water purification system 100 may be supplied as a unit and can be located at the point of use, such as in a dwelling. Untreated water desired to be purified can be loaded into the feed water container 102. The feed water container 102 contains a prefilter 106 in the interior thereof. The prefilter can be of conventional design that may include ceramic filters, bag filters, and/or carbon filters. The prefilter may initially remove particulates of specific size, and/or remove any odors or color, and any non-soluble particulates. The prefilter 106 is connected to a cartridge 108 that contains the water purification medium, such as a polymer having heterocyclic N-halamine moieties. The feed water container 102 is attached to the purified water container 104 in an integral manner to prevent untreated water from bypassing the prefilter 106 and cartridge 108. Cartridge 108 is interior to the purified water container 104.

Untreated water fed to the feed water container 102 travels through the prefilter 106 and into the cartridge 108, where the untreated water contacts the purification medium and is thereby treated. The treated water exits the cartridge 108 and is collected in the purified water container 104. The purified water can be dispensed through faucet 110. The orientation of the water purification system is such to take advantage of gravity. The force of gravity is the force that drives the water through the prefilter 106 and the cartridge 108. The shape and size of the feed water container 102 and purified water container 104 can be of any dimensions to accommodate the design capacity, pressure, and flow rate through the prefilter 106 and cartridge 108.

Figure 2:
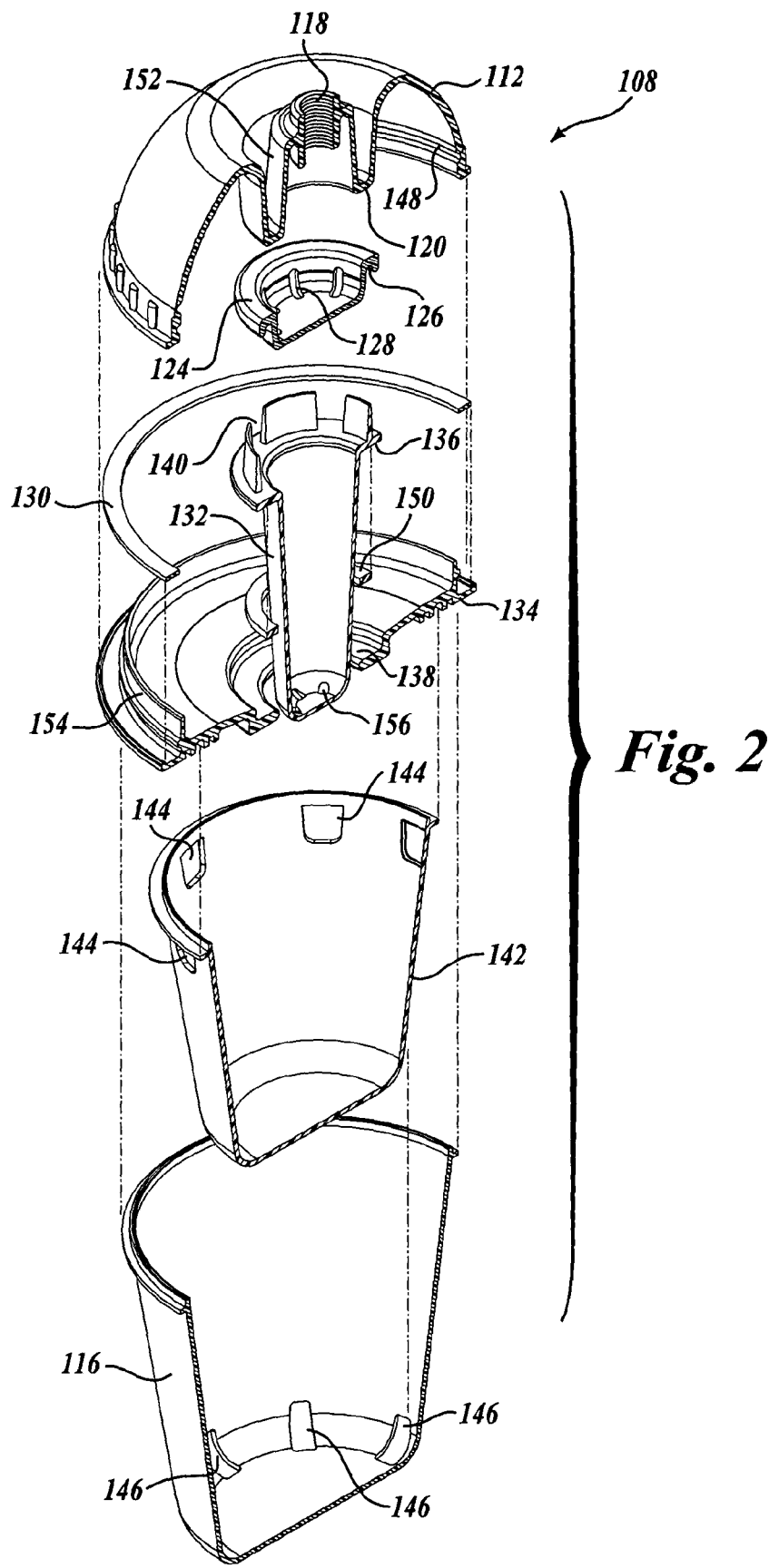
FIG. 2 is an illustration of an exploded cross section of the cartridge according to the present invention.
Figure 3:
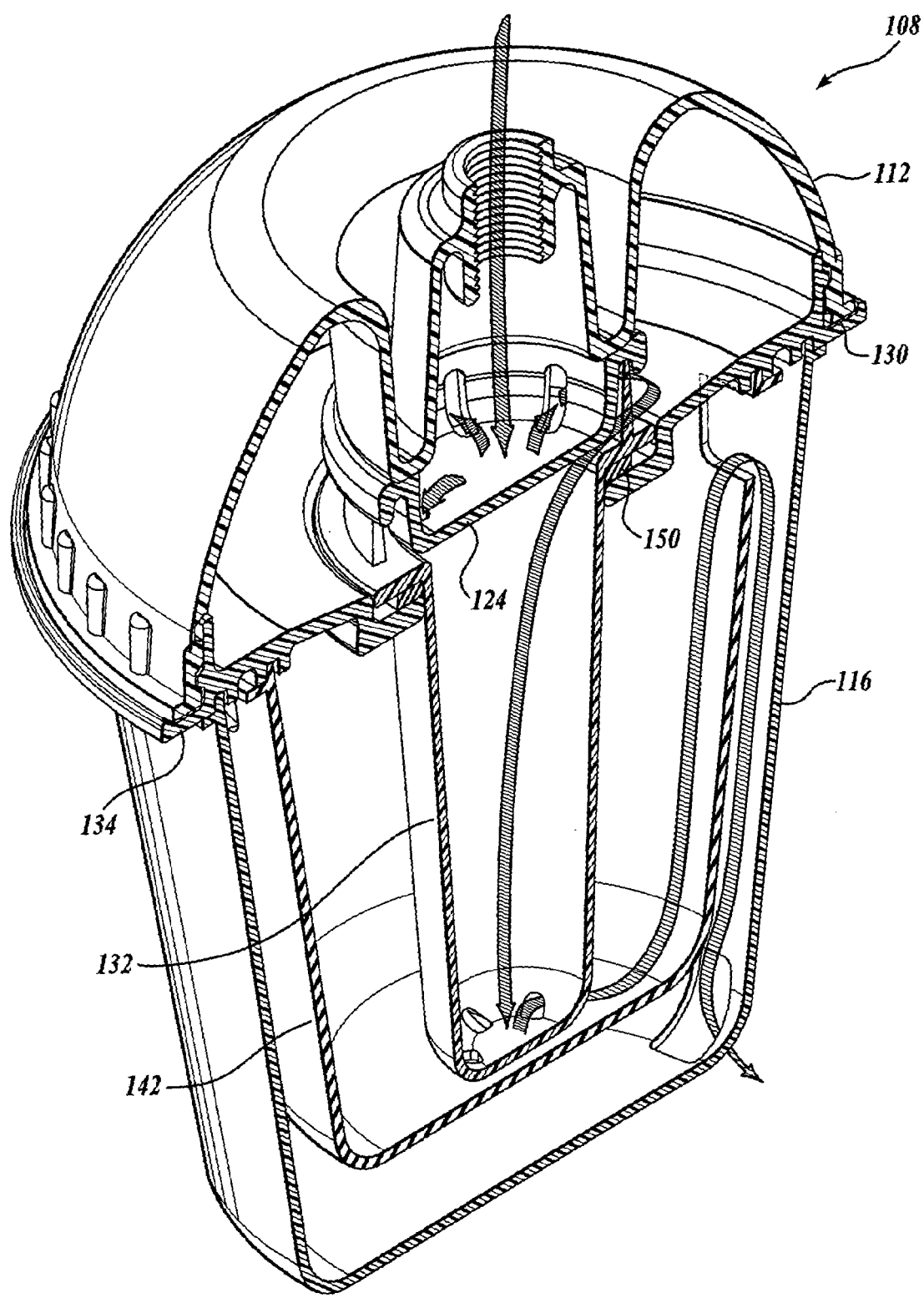
FIG. 3 is an illustration of a cross section of the cartridge according to the present invention.

Referring now to FIGS. 2 and 3, the cartridge 108 comprises an inlet head cap 112, a compression ring 124, a bulkhead 134, a purifier vessel 132, a dwell chamber 142, an outer skin 116, gasket 130, interposed between the inlet head cap 112 and bulkhead 134; and gasket 150, interposed between the purifier vessel 132 and bulkhead 134.

The inlet head cap 112 comprises a neck 152 that can attach to a variety of outlet nozzles typically found on prefilters. The inlet head cap 112 is attached to the prefilter 106 in an integral manner via the neck 152. It will be apparent to those skilled in the art from a reading of the disclosure that attaching the inlet head cap 112 to the prefilter 106 can be achieved in a variety of ways. Specifically, in the embodiment described herein, the inlet head cap 112 is attached to the prefilter 106 via a threaded connection 118 provided on neck 152.

The inlet head cap 112 is designed to have an axial fluid flow path leading from the threaded inlet 118 to a compression ring 122. A pair of cylindrical walls extend downward from the inlet head cap, thusly forming the neck portion 152 and axial fluid flow path. The walls of the neck come together to create a flattened lower surface that during use, will press against the upper surface of the compression ring 124. The compression ring 124 has a cylindrical sidewall with a plurality of holes 128. The water flow path is diverted by the compression ring 124 from the generally axial flow produced by the inlet head cap 112 to a generally radial flow at the compression ring 124. Directly below the compression ring 124, a purifier vessel 132 that contains the purification medium, is provided.

The purifier vessel 132 is designed with a generally open upper end to receive untreated water flowing through the compression ring 124, and a generally closed lower end, that is capable or discharging the treated water. The open end has a horizontal flange 136 that is formed perpendicular to the cylindrical sidewall of the purifier vessel 132. A plurality of pegs 140 is spaced along the upper circular surface of the horizontal flange 136. The pegs 140 define a plurality of spaces between adjacent pegs to allow untreated water to flow therethrough and into the purifier vessel 132. The upper ends of the pegs 140 define the perimeter of a circle, wherein the ends of the pegs 140 are configured to mate with a groove 126 formed underneath the compression ring upper surface. The lower end of the purifier vessel 132 has a plurality of holes 156 generally distributed in a radial pattern to distribute the treated water from the lower end of the purifier vessel. The water leaving the purifier vessel is distributed in a generally radial direction after travelling generally axially through the main portion of the purifier vessel.

The underside of the purifier vessel horizontal flange 136 is in contact with the gasket 150, which rests on a depressed surface 138 formed in the center of the bulkhead 134. Gasket 150 is a compressible gasket having a hardness of about 20 to about 80 units measured with a Shore A durometer. Gasket 150 is made from a non-leaching material, such as ethylene propylene diene monomer (EPDM), which is suitable for potable water applications. The main body of the purifier vessel 132 passes through a center hole provided in the bulkhead 134. The bulkhead 134 is circular and can have a gradual slope from the outermost perimeter to the center hole. The untreated water from the compression ring 124 flows through the compression ring holes 128 and is distributed on the upper side of the bulkhead 134. The untreated water thus collects evenly around the perimeter of the open end of the purifier vessel 132. The water is channeled into the purifier vessel 132 through the spaces between the pegs 140. The purifier vessel 132 may be tapered as illustrated, or may be of a constant diameter. The untreated water contacts the purification medium within the purifier vessel 132. The treated water exits the purifier vessel 132 at the outlet holes 156 in a generally radial manner. After passing through the purifier vessel 132, the treated water flows into the dwell chamber 142. The dwell chamber 142 is provided for additional treatment residence time with the residual halogen species. Suitable minimum residence times are about 2 to about 5 minutes. The dwell chamber 142 is a container with a closed lower end, and outlet holes 144 provided at an upper location on the vertical walls of the dwell chamber 142. The treated water accumulates in the dwell chamber 142 as the level builds upward in the dwell chamber 142 in a generally axial manner. The water is allowed to reach the uppermost portion of the dwell chamber 142, which is directly beneath the bulkhead 134. Dwell chamber holes 144 allow the water to exit the dwell chamber 142 from an upper location thereof in a generally radial direction. The dwell chamber outlet holes 144 are large enough not to impede flow and create additional pressure drop.

The dwell chamber 142 is provided within the interior of the outer skin 116, and exterior to the purifier vessel 132. The outside diameter of the dwell chamber 142 is smaller than the inside diameter of the outer skin 116, so that an annular space is formed between the dwell chamber 142 and the outer skin 116. Both the dwell chamber 142 and the outer skin 116 can be tapered at an angle to match the taper of the purifier vessel 132. Alternatively, the purifier vessel 132, the dwell chamber 142, and the outer skin 116, can be provided as components having a constant diameter. The treated water generally flows downward in an axial direction in the annular space between the dwell chamber 142 and the outer skin 116. The water is discharged from the outer skin 116 in a generally radial direction through holes 146 in the lower portion of the outer skin 116. The treated water exiting the outer skin 116 is collected in the purified water container 104, shown in FIG. 1.

The bulkhead 134 can have horizontal circular grooves on its underside that can mate with a horizontal circular ring on the dwell chamber 142, or on the outer skin 116, to attach the dwell chamber 142 and outer skin 116 to the bulkhead 134. The dwell chamber 142 and outer skin 116 can be attached to the bulkhead 134 with adhesives, sonic welding, snap together fasteners, or other suitable means. The outer skin 116 is exterior the dwell chamber 142. The outer skin 116 is sealed at the upper end to the bulkhead 134, and has outlet holes 146 located at a lower portion thereof. Treated water exits the outer skin 116 in a generally radial direction from holes 146, after having passed through the annular section in between the dwell chamber 142 and outer skin 116.

Bulkhead 134 separates the untreated water above the bulkhead 134 in the inlet head cap 112 from treated water below the bulkhead 134. The inlet head cap 112 has threads 148 located at the interior side of the lower end of the inlet head cap 112. The threads 148 mate with corresponding threads 154 on the bulkhead 134. Gasket 130 is provided at the union of the inlet head cap 112 with the bulkhead 134. Gasket 130 is generally incompressible so as to allow slippage of the inlet head cap 112 and the bulkhead 134 for ease of taking apart. As the inlet head cap 112 is screwed to the bulkhead 134, the flattened surface 120 of the neck portion 152 presses against the compression ring 124. In turn, the compression ring 124 presses down on the purifier vessel 132 that abuts the bulkhead 134, and compresses the gasket 150 against the bulkhead 134, thus sealing the untreated water side of the bulkhead 134 from the treated water side.

During operation, the compression ring 124 uniformly transfers the compressive force from the inlet head cap 112 to the underlying purifier vessel 132. The compression ring 124 uniformly redistributes the water flow into the inlet of the purifier vessel 132 in a generally radial manner. The compression ring 124 also can provide a uniform water level to evenly distribute the untreated water equally to all sides of the purifier vessel 132. The water flows into the purifier vessel 132 in the spaces between adjacent pegs 140.

The compressive forces ensure that the purifier vessel 132 is properly sealed for use as a water purifier without bypassing untreated water. The compression ring 124 seals to the purifier vessel 132 by transferring the compressive force created by fastening the inlet head cap 112 to the bulkhead 134 via a gasketed threaded system comprising a mated thread 148 and gasket 130. The compressive force is transferred to the compression ring 124 from the inlet head cap 112 via the neck 152 to the purifier vessel's pegs 140, thus pushing down on the purifier vessel 132. The compressive force is transferred from the purifier vessel's 132 horizontal flange 136 to the bulkhead's seat portion 138. The result is a watertight seal that is easily disassembled by hand.

The segmented pegs 140 that extend from the top of the flange 136 of the purifier vessel 132 serve two purposes. The first purpose is to transfer the compressive force from the compression ring 124 down to the flange 136. The second purpose is to provide the end user with a means to easily remove and insert the purifier vessel 132 when required. Removal of the purifier vessel 132 can allow recharging polystyrene hydantoin and/or replacing of the entire purifier vessel 132 and/or quickly and easily inserting the purifier vessel 132 into the cartridge during initial manufacture. The compressible gasket 150 that underlies the flanged portion of the purifier vessel 132 and bulkhead 134 is of an appropriate durometer and thickness to allow for adequate compression and sealing of the purifier vessel 132 to the bulkhead 134 so as to prevent any water from bypassing the purifier vessel 132. The shape of the purifier vessel 132 has a geometry that allows for even plug flow through the purification medium bed. In one embodiment, the aspect ratio, defined as the ratio of the length to the largest inner diameter dimension of the purifier vessel 132 is greater than or equal to 3. Higher aspect ratios may be used, but at ratios above 4.5, the pressure across the bed purification medium bed can increase to a point where it may impede water flow and reduce the performance of the overall cartridge. The slight taper from inlet to outlet of the purifier vessel 132 can be used to improve manufacturability, but is not required. The purifier vessel walls are impermeable so that water cannot permeate into the other portions of the cartridge prior to traveling through the entire biocidal purification medium bed. A purification medium bed with an aspect ratio equal to or greater than 3 ensures that the water will flow through the purification medium bed within the purifier vessel 132 efficiently and in a plug flow fashion. Retaining elements (not shown) of a permeable material, such as nonwoven mesh, or monofilament filter cloth, can be attached to the inlet end of the purifier vessel 132 and the outlet end of the purifier vessel 132, that are capable of holding particle sizes on the order of about 50 to about 750 microns in diameter. The outlet end of the purifier vessel 132 can have a nonwoven batt that overlies the inside of the outlet holes of the purifier vessel 132 to retain the purification medium within the purifier vessel 132. The batt is porous enough not to impede flow from the medium, while fine enough to retain the purification medium within the purifier vessel 132. In one embodiment of the cartridge, the purifier vessel 132 can hold about 10 to about 50 grams of a purification medium.

Post-purification treatment of the treated water after exiting the purifier vessel 132 can take place in the dwell chamber 142 and outer skin 116. The residence time spent within the dwell chamber provides an opportunity to post treat the treated water. Water level rises in the dwell chamber 142, then flows radially out of the dwell chamber 142 and down through the annular space created between the dwell chamber 142 and the outer skin 116. The annular space can be filled with a variety of water treatment media for additional post-purification treatment of water. The annular space can provide a means to customize the cartridge for the specific local needs of the water to be treated. The volume of the annular space can be adjusted either by increasing the diameter and/or length of the dwell chamber 142 or outer skin 116. The annular space can be filled with media that is capable of removing heavy metals (e.g., KDF 55, iron sulfate, chitosan treated iron granules), residual organics and halogens (i.e., granular activated carbon) and/or to add mineralization for taste. The annular space provides a means to post-treat the treated water in an economical and compact way.

Additionally, the bulkhead 134 provides a means for the dwell chamber 142 and outer skin 116 to be properly aligned and attached to the remainder of the cartridge elements. The bulkhead 134, through its center opening, provides a means to align the purification vessel 134 properly with the dwell chamber 142 and outer skin 116. The gradually sloping surface of the bulkhead 134 to the central hole results in a water level that is uniformly and substantially the same height all around the entrance to the purifier vessel 132. The bulkhead 134 provides users with access to the compression ring area without having to remove the entire cartridge from the system. The inlet head cap 112 can be attached to the bulkhead 134 through the use of a frictional seal. The sealing gasket 130 located at the union of the inlet head cap 112 with the bulkhead 134 is made from a material that prevents binding of the bulkhead 134 to the inlet head cap 112 and creates a leak-proof seal, thereby preventing untreated water from bypassing the purifier vessel 132. In one embodiment, the gasket 130 can be made from polyurethane.

The reaction of viruses with halogenated polystyrene hydantoin is substantially irreversible and requires time to demonstrate a certain level of microbial efficacy. In the case of bacteria, however, the inactivation could be reversed if inadequate time (i.e., volume) is used. For the cartridge herein described, the medium free volume of the dwell chamber 142 is about 300 cubic centimeters. This volume is suitable for the inactivation of both viruses and bacterium to meet efficacy levels of 4-log and 6-log reductions respectively recommended by the EPA and WHO.

It should be noted that the contact time in the dwell chamber 142 of the present invention is not analogous to conventional holding tanks and conventional dwell chambers. Holding tanks contain non-potable water that passes through a high residual biocidal halogen such as iodine resin or chlorine tablets during which time the water acquires a concentration of biocides suitable for purification, typically on the order of 14 ppm iodine or 9 ppm free chlorine. The mechanism for purification then takes place within the holding tanks in which the halogen attaches and inactivates or lyses organisms. Typical times in such holding tanks are on the order of 30 minutes to 70 minutes. Using the chlorinated polystyrene hydantoin beads described in U.S. Pat. No. 6,548,054, the residual halogen concentration leaving the purification vessel 132 and residing in dwell chamber 142, is on the order of 0.1 ppm to 0.5 ppm by weight free chlorine ($Cl_2$). Even at holding tank sizes of 70 minutes, such low residual free chlorine concentrations are inadequate to achieve 4-log inactivation of halogen resistant viruses such as poliovirus. However, use of chlorinated polystyrene hydantoin beads achieves 4-log inactivation even at the low levels of residual chlorine, such as less than 1 ppm.

Additionally, because of the low flow rate normally achieved in gravity feed devices, the flow character through the dwell chamber 142 is quiescent and laminar. The water surface level is horizontal thereby achieving uniform filling of the dwell chamber 142. The majority of the pressure generated from the height of the water is consumed when the water passes through the prefilter. The remaining pressure is sufficient for water to flow through the purification vessel 132, dwell chamber 142, annular space and exit at the outlet of the outer skin 116. It should be appreciated that volumes and shapes of these components can be varied to achieve different flow rates and different inactivation levels.

Without the proper design of the dwell chamber 142, the annulus could not be used to house additional treatment media. However, the cartridge 108 does not require additional media in order to purify non-potable water to purification standards, such as those specified by the EPA and WHO. In addition to the annulus, additional post-treatment media can be added at a bottom interior location in the outer skin 116. After passing through the annulus and the outer skin 116, the treated, purified water exits the cartridge 108 from the bottom of the outer skin 116 through the holes 146 in a generally radial direction.

The outer skin 116 further serves to provide an aesthetically pleasing shape to the overall cartridge 108 and to prevent cross-contamination of the treated water during handling. A common problem with many gravity filtration and purification devices is that when handled by the user, the surfaces on which treated waters flow can be easily contaminated by contaminated hands, thus rendering the cartridge useless in the goal of purifying water. It should also be noted that the outer skin 116 of the cartridge 108 forms several functions. Firstly, the outer skin 116 provides a means for the end user to handle the cartridge 108 while removing the purification vessel 132 from the inlet head cap 112. Secondly, the outer skin 116 ensures that none of the treated water or treatment surface of the dwell chamber 142 will be contaminated during routine handling of the cartridge 108. Cross-contamination is a chronic problem with many water filter and treatment devices and it is highly recommended by the WHO to avoid and minimize cross-contamination as the treated water would be rendered unsuitable for drinking.

Ideally, the purification medium used in the purifier vessel should be stable at ambient temperature within the cartridge 108. The purification medium should be insoluble in water so that it cannot be consumed by persons drinking the treated water. The purification medium should control and/or inactivate a wide variety of pathogenic microorganisms. The purification medium should not leach hazardous and/or harmful chemicals into the water. The purification medium should provide residual free halogen species at a low level so as not to impart an undesirable odor, taste, or produce subsequent reaction by-products, such as trihalomethanes. The purification medium should be effective under a broad range of water pH and temperatures. The purification medium should provide biocidal effects for relatively long periods of use requiring simple and easy operation for the user. The purification medium should be regenerable and rechargeable as needed with commonly available sources so as to increase the cost effectiveness of the cartridge. The purification medium may need to be periodically recharged. The halogen depleted polystyrene hydantoin can be halogenated with either chorine or bromine. As a result, a variety of sources of free chlorine, such as sodium hypochlorite or calcium hypochlorite according to the methods described by U.S. Pat. No. 6,548,054 can be used to rechlorinate the polystyrene hydantoin.

To fully take advantage of the performance of the halogenated polystyrene hydantoin beds, the cartridge 108 must allow for the end user to recharge the medium. In one embodiment, the end user can remove the purification vessel 132 from the inlet head cap 112. Once removed, the purifier vessel 132 that contains the halogen-depleted polystyrene hydantoin can be quickly recharged in situ according to U.S. Pat. No. 6,548,054. Once recharged, the purifier vessel 132 can be reinserted within the bulkhead 134 and sealed for leak-proof operation.

The materials of manufacture for the components of the cartridge are of chlorine-resistant polymers and/or plastics, such as polypropylene or polycarbonate.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A gravity fed water purification cartridge, comprising:
    an inlet head cap configured to be coupled to a prefilter, wherein said inlet head cap provides an inlet for untreated water;
    a ring member in fluid flow communication with the inlet head cap, wherein said ring member is configured to evenly distribute the untreated water to a purification medium;
    a purifier vessel in fluid flow communication with the ring member, wherein said purifier vessel contains a polymer having pendant hydantoin groups to treat said untreated water and provide treated water;
    a bulkhead coupled to the inlet head cap and configured to separate the untreated water from treated water;
    a dwell chamber coupled to the bulkhead, wherein said dwell chamber provides residence time for treatment of the treated water with residual halogen, and wherein the dwell chamber is in fluid flow communication with the purifier vessel; and
    an outer skin coupled to the bulkhead and enclosing the dwell chamber, wherein said outer skin and dwell chamber provide an annular space therebetween, and wherein said outer skin is configured to discharge said treated water.

2. The cartridge of claim 1, wherein the polymer is capable of binding and releasing a halogen.

3. The cartridge of claim 1, wherein the inlet head cap compresses the ring member against the purifier vessel, and the purifier vessel is compressed against the bulkhead to provide a sealed space.

4. The cartridge of claim 1, wherein the purifier vessel has a capacity to hold about 10 to about 50 grams of the polymer.

5. The cartridge of claim 1, wherein the polymer is at least one of a halogenated polystyrene hydantoin, a polystyrene hydantoin, a hydantoinylated siloxane, or a halogenated hydantoinylated siloxane.

6. The cartridge of claim 1, wherein the purifier vessel comprises a plurality of pegs configured to transfer a compressive force induced by the inlet head cap to a flange on the purifier vessel.

7. The cartridge of claim 1, wherein the purifier vessel is seated on a compressible gasket of about 20 to about 80 shore A durometer.

8. The cartridge of claim 7, wherein the gasket is non-leaching and suitable for drinking water applications.

9. The cartridge of claim 1, wherein a gasket is located at the coupling of the inlet head cap to the bulkhead.

10. The cartridge of claim 9, wherein the gasket is substantially incompressible.

11. The cartridge of claim 1, wherein the dwell chamber provides a residence time of at least about 2 to about 5 minutes.

12. The cartridge of claim 1, wherein the annular space is configured to hold an additional water treatment medium.

13. The cartridge of claim 12, wherein the additional treatment medium includes at least one of activated carbon, mineralization materials, or heavy metal removal agents.

14. The cartridge of claim 1, wherein the purifier vessel, dwell chamber, and outer skin are comprised of chlorine resistant materials.

15. The cartridge of claim 1, wherein the polymer is configured in a bed having an aspect ratio of at least 3.

16. A water purification cartridge, comprising:
    an inlet member configured to provide untreated water in a first axial direction;
    a ring member in fluid flow communication with said inlet member and adjacent to said inlet member, wherein said ring member has a base that is surrounded by a sidewall with a plurality of passages around the periphery of the sidewall;
    a purifier vessel adjacent to said ring member, wherein said purifier vessel is configured to treat said untreated water to provide treated water, the purifier vessel comprising supports spaced around the circumference of the opening of the purifier vessel to define a plurality of passages that allows untreated water to flow therethrough and into the purifier vessel, wherein the base of the ring member is elevated above and substantially covers the opening of the purifier vessel so that untreated water enters the purifier vessel from the sides of the opening of the purifier vessel below the base of the ring member;
    a bulkhead adjacent to said purifier vessel, wherein said bulkhead is configured to separate untreated water from treated water;
    a dwell chamber in fluid flow communication with said purifier vessel and exterior to said purifier vessel, wherein said dwell chamber is configured to provide treated water flow in a second axial direction opposite to the first axial direction.

17. The cartridge of claim 16, wherein the purifier vessel contains at least one of a halogenated polystyrene hydantoin, a polystyrene hydantoin, a hydantoinylated siloxane, or a halogenated hydantoinylated siloxane.

18. The cartridge of claim 17, wherein the halogen is chlorine or bromine.

19. The cartridge of claim 16, wherein the ring member distributes untreated water in a radial direction.

20. The cartridge of claim 16, further comprising a polymer having pendant hydantoin groups, wherein said polymer provides a residual halogen concentration of less than 1 ppm.

21. The cartridge of claim 16, further comprising a polymer having pendant hydantoin groups, wherein said polymer provides a residual halogen concentration of 0.1 ppm to 0.5 ppm.

* * * * *